United States Patent [19]

Rumberger

[11] Patent Number: 4,838,831
[45] Date of Patent: Jun. 13, 1989

[54] COUPLING FOR CONNECTING TWO SHAFTS

[75] Inventor: William E. Rumberger, Newtown Sq., Pa.

[73] Assignee: The Boeing Company, Seattle, Wash.

[21] Appl. No.: 706,242

[22] Filed: Feb. 28, 1985

Related U.S. Application Data

[63] Continuation of Ser. No. 429,408, Sep. 30, 1982, abandoned.

[51] Int. Cl.$^4$ ............................................. F16D 1/00
[52] U.S. Cl. .................................. 464/88; 403/338; 464/182
[58] Field of Search ............ 285/371, 373, 398, 419; 403/293, 335, 338; 464/87, 88, 147, 182, 183

[56] References Cited

U.S. PATENT DOCUMENTS

| | | | |
|---|---|---|---|
| 818,511 | 4/1906 | Allen | 403/293 X |
| 1,782,484 | 11/1930 | Spencer et al. | 285/398 X |
| 2,011,433 | 8/1935 | Blagg et al. | 285/371 X |
| 2,340,732 | 2/1944 | Bruno | 285/371 X |
| 2,541,205 | 2/1951 | Christophersen | 403/338 X |
| 3,006,663 | 10/1961 | Bowne | 403/338 X |
| 3,188,117 | 6/1965 | Press et al. | 285/398 X |
| 3,503,632 | 3/1970 | Braun | 285/371 X |
| 3,851,902 | 12/1974 | Robinson | 285/371 X |
| 4,053,247 | 10/1977 | Marsh, Jr. | 285/398 X |

FOREIGN PATENT DOCUMENTS

| | | | |
|---|---|---|---|
| 801355 | 1/1951 | Fed. Rep. of Germany | 403/293 |
| 337694 | 5/1959 | Switzerland | 464/43 |

Primary Examiner—Daniel P. Stodola
Attorney, Agent, or Firm—Jones, Tullar & Cooper

[57] ABSTRACT

A coupling for connecting shafts for rotation. The coupling can include as few as two major parts, including a reaction ring and an adjustable clamping structure. The shaft or shafts to be coupled are provided with outwardly flared ends, each defining an inner and outer surface, and the noted major parts with corresponding flared portions. Both the inner and outer surface of each outwardly flared end is subject to a pressure force exerted by the major parts to effect a pressure clamping of the flared ends, and thereby a connection. Also, at least one of the two major parts and the shafts at their flared ends include compatible alignment and torque transmitting structure. Rather than two major parts, either shaft can be modified to include, as an integral part thereof, one of the major parts.

14 Claims, 3 Drawing Sheets

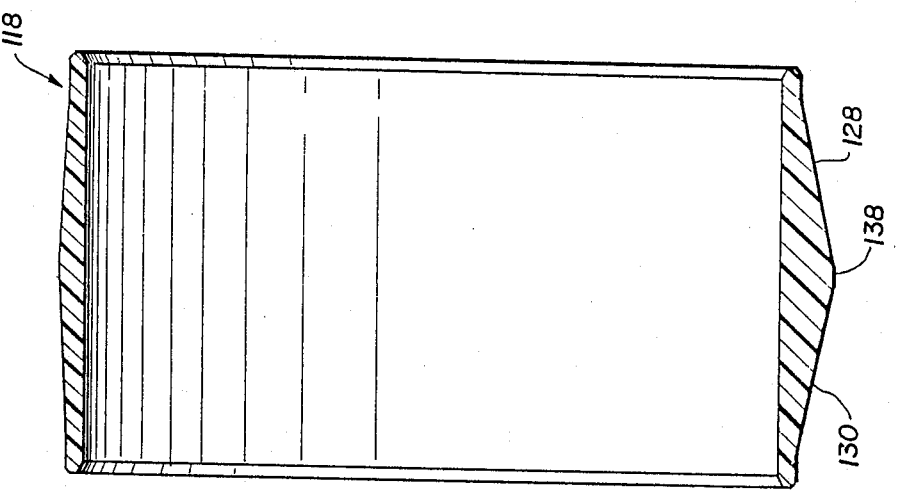
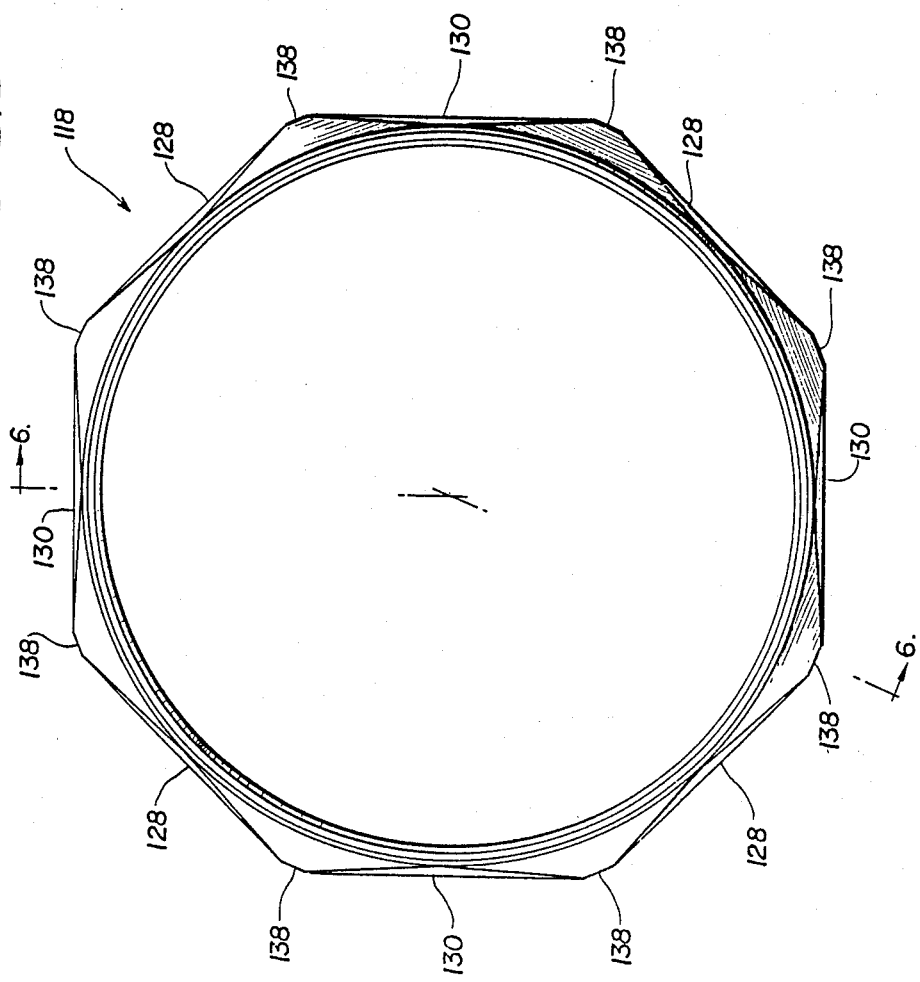

COUPLING FOR CONNECTING TWO SHAFTS

This is a continuation of Ser. No. 429,408 filed on Sept. 30, 1982, now abandoned.

BACKGROUND OF THE INVENTION

1. Field of the Invention

The present invention relates to the subject matter of couplings and to a method of coupling shafts without the need to drill or to perform significant machining on the shafts to be connected.

A particular application of the present invention resides in the coupling of composite shafts, i.e., shafts fabricated from continuous filaments in either a roving or tape form within a resin matrix.

The shafts and couplings may be used in a static structural application or in a dynamic environment where they may be required to transmit torque and power.

2. Prior Art

There are many varieties of shaft couplings. For the most part, the shaft to be coupled must be modified in some way to accommodate the coupling. For example, holes may have to be drilled in the shaft to accommodate bolts or other fastening means; the shaft may have to be grooved to accommodate keys or the like; or the shaft may be subjected to excessive compression due to press fitting. All of these methods detract from the advantages of the continuous filament structural design, in that the load transmission capacity of the shaft is substantially reduced through the interruption of the filaments by drilling holes or any machining which will cut the filaments. Further, if the composite shaft is subjected to alternating loads, the stress concentration in the areas of interrupted fibers could result in premature failure. The development of continuous roving or tape wound shafting has introduced a redundant and forgiving structure when compared with the rapid crack propagating and notch sensitive characteristics of metal structures. However, the use of holes or grooves for coupling purposes in composite shafts detracts from the advantages of the composite material, hence it would be desirable to eliminate cutting of fibers in any of the stressed areas.

OBJECTS AND SUMMARY OF THE INVENTION

An object of the present invention is to provide a coupling which can be used to connect shafts of any material without requiring machining which would cut the load carrying filaments of a shaft.

It is another object of the present invention to provide a method of connecting multiple shafts of any material without the utilization of machining, such as bolt holes or keyway deformations in the shafts.

It is a related object of the present invention to achieve the previously stated objects with a coupler having relatively few parts, and according to one embodiment, no more than two major parts.

To summarize: an effective coupling is achieved by constructing the ends of the shafts to be connected to include flared end portions. These flared end portions define an inner and an outer surface which, according to one embodiment, serve as engagement surfaces against which pressure is applied by the coupling. This pressure can be further described as a clamping/wedging action. To apply pressure to the engagement surfaces, the coupling has surfaces which are compatible with the engagement surfaces, i.e., they are flared surfaces.

According to the noted embodiment, the coupling comprises two major parts, namely, an adjustable split-ring and a reaction ring. To achieve effective coupling with just two major parts, the split-ring and the reaction ring are designed to include compatible surfaces which engage with the inner and the outer surfaces of the flared end portions of the shafts. By designing the coupling so that both the split-ring and the reaction ring engage corresponding surfaces on the flared end portions of the two shafts to be connected there results a more effective load transfer through a wedging action without shaft deformation.

Further, shaft alignment and torque transmission (typically for dynamic applications) can be achieved by modifying one of the two parts of the coupling and the flared end portion. Specifically, the reaction ring is provided with one or more protrusions or flats on one or both of its engagement surfaces. Correspondingly, the facing surface of the flared end portion of the shaft is provided with one or more recesses or flats to receive the protrusion or flats. The protrusion or flats recess arrangement results in a positive alignment and torque coupling feature which effectively eliminates relative surface movement. In the case of a metal shaft the recess or flat can be cast or swaged, and in the case of a composite shaft the recess or flat is produced by the geometry of the tools involved i.e., winding the mandrel or mold on which the composite shaft is developed.

According to a variant of the noted embodiment, the reaction ring can be fabricated as part of the flared end portion of one of the shafts.

According to another embodiment of the invention, the coupling includes a threaded fitting and a threaded sleeve in place of the split-ring. With this embodiment, the shaft may be connected to another shaft or to some other device.

BRIEF DESCRIPTION OF THE DRAWINGS

Seven figures are presented directed to two preferred embodiments and several variants of these embodiments of the invention. These are:

FIG. 5, which illustrates an end view of a variant of the reaction ring;

FIG. 6, which illustrates a view of FIG. 5 taken along line 6—6; and

DETAILED DESCRIPTION OF THE PREFERRED EMBODIMENTS

Figure 1:
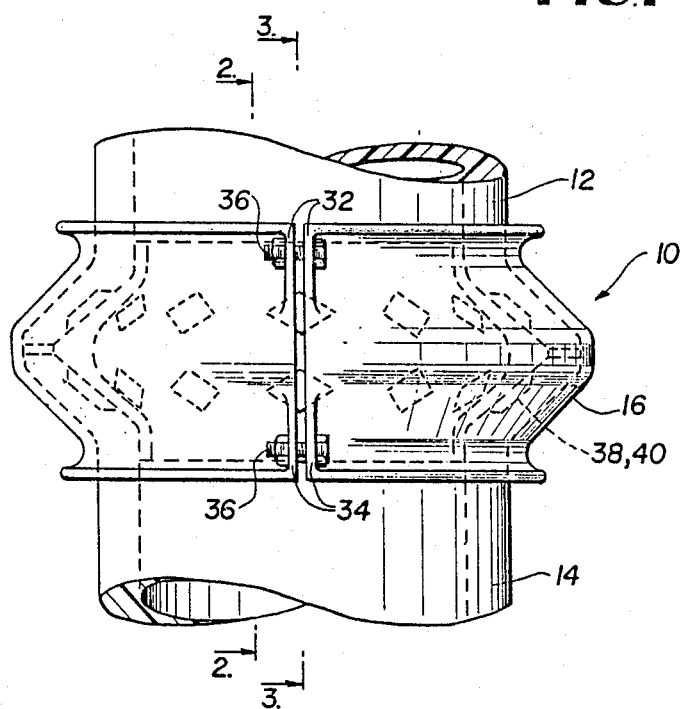
FIG. 1, which illustrates an external view of the coupling and two shafts connected by the coupling.

Turning to FIG. 1, a coupling 10 connecting shafts 12 and 14 is shown. The coupling 10 according to a first embodiment comprises two major parts, namely, an adjustable split-ring 6 and a reaction ring 18.

Figure 2:
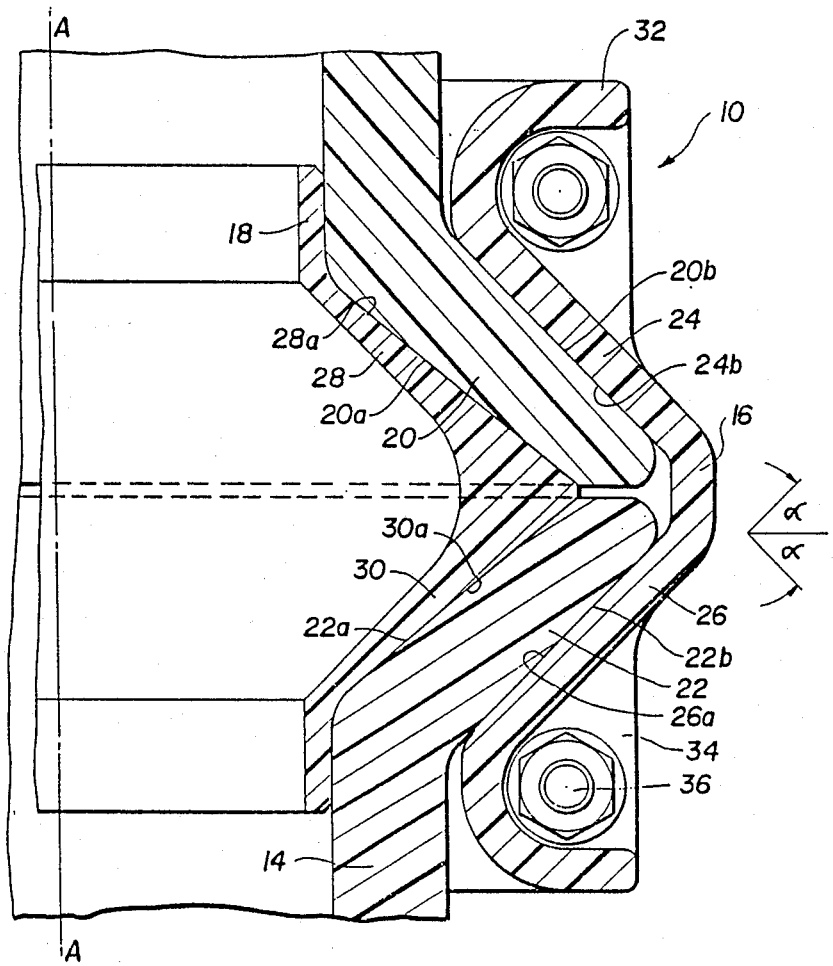
FIG. 2, which illustrates a view of FIG. 1 taken along line 2—2, illustrating details of the shaft ends, the reaction ring, and the split-ring in accordance with one embodiment of the invention.
Figure 3:
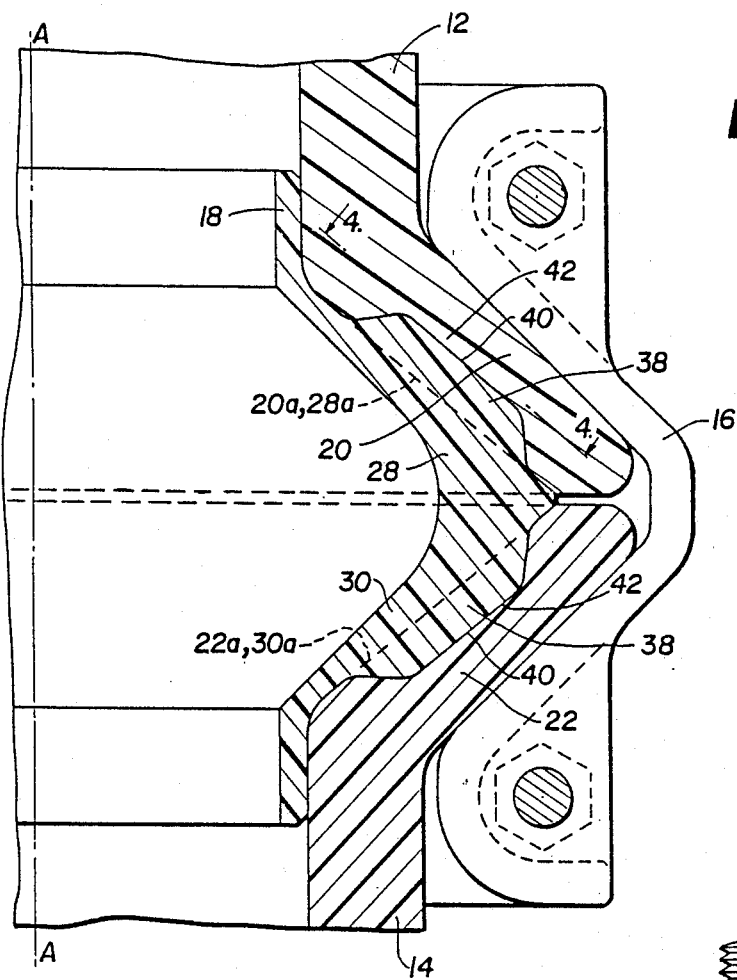
FIG. 3, which illustrates a view of FIG. 1 taken along line 3—3, illustrating the features illustrated in FIG. 2 and in addition, the alignment and torque coupling feature according to one embodiment of the invention.

The shafts include an outwardly flared end portion 20 and 22 relative to the longitudinal axis A—A (FIGS. 2 and 3). The flare angle $\alpha$ is arbitrary, and preferably less than 45°. The flared end portions 20 and 22 define inner surfaces 20a, 22a and outer surfaces 20b, 22b.

The split-ring 16 and the reaction ring 18 include outwardly flared portions 24, 26, 28 and 30. The flare angle $\alpha$ of each of the portions 24, 26, 28 and 30 is equal to the flare angle $\alpha$ of the end portions 20 and 22 of the shafts 12 and 14.

The portions 24, 26 of the split-ring 16, and the portions 28, 30 of the reaction ring 18 are joined to form a continuous structure. As such, the split-ring 16 defines two inner surface sections 24a and 26a, while the reaction ring 18 defines two outer surface sections 28a and 30a. The surfaces 24a, 26a, 28a and 30a comprise compatible surfaces to the surfaces 20b, 22b, 20a and 22a, respectively. Engagement of the surfaces under pressure locks the two shafts 12 and 14 together. To generate the pressure at the engaged surfaces, the split-ring 16 is adjusted circumferentially. For this purpose, the split-ring 16 is provided with lug pairs 32 and 34 which receive a threaded bolt and nut combination 36 (FIGS. 1 and 2). Drawing the lugs of the lug pairs 32 and 34 together by the bolt and nut combinations 36 generates a hoop-type pressure at the engaged surfaces.

To effect a more positive alignment of the shafts 12 and 14, and a more positive torque coupling between the shafts, which is desirable when one of the shafts is to drive the other shaft about the longitudinal rotation axis A—A, either the split-ring 16 or the reaction ring 18 is preferably provided with extensions or protrusions which engage in corresponding recesses in the flared end portions of the shaft. To illustrate: FIG. 3 shows the reaction ring portions 28 and 30 provided with protrusions 38 which are received within recesses 40 in the end portions 20 and 22 of the shafts 12 and 14. During adjustment of the split-ring 16 the protrusions 38 are received within their respective recesses 40, thereby bringing the respective longitudinal axes A—A of the shafts 12 and 14 into coincidence. Also, when, for example, a torque is to be transmitted between the shafts 12 and 14, the efficiency of the transmission is improved by the engagement of the protrusions 38 within their respective recesses 40. This is so because, as a result of the engagement of the protrusions within their respective recesses, reliance on frictional forces at the engaged surfaces is reduced and a surface-to-surface contact in the direction of rotation produced by the protrusions and the wall of the recess in which it engages is achieved.

Figure 4:
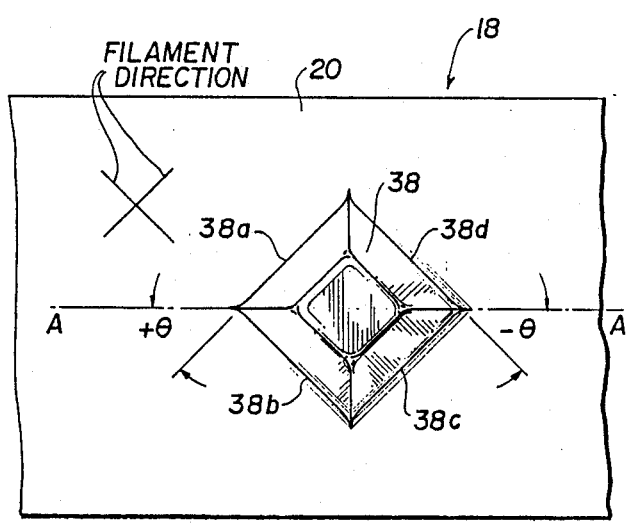
FIG. 4, which is a view taken along line 4—4 of FIG. 3, illustrating one configuration of the alignment and torque transmitting feature according to one embodiment of the invention.

Preferably, the protrusions 38 and the corresponding recesses 40 define a polygon in outline, such as the star-outline shown in FIG. 4. The desirability of this outline will be made apparent from the discussion of the method that follows.

In those applications where a torque reversal is desirable, an elastomeric sheet 42 (FIG. 3) is inserted between the surfaces 20a, 28a and 22a, 30a. The elastomeric sheet 42 serves to distribute the load over a larger surface area by its deformation.

As a first variant of the first embodiment, it is proposed to form either the flared end portions 20 or 22 integral with the reaction ring 18.

As a second variant of the first embodiment, it is proposed to modify the reaction rings 18 to that shown in FIGS. 5 and 6, i.e., to a reaction ring 118. The outer surface of the reaction ring 118 has an octagon profile in end view (FIG. 5) and matching cones in side view (FIG. 6). The octagon profile is made up of flat surfaces 128 and 130 which form apexes 138 between them. The flat surfaces and apexes (together referred to as flats) serve the function of the protrusions 38 of the previous embodiment. For this configuration of reaction ring the inner surface of the flared end portions 20 and 22 are appropriately fabricated each with a matching surface.

Figure 7:
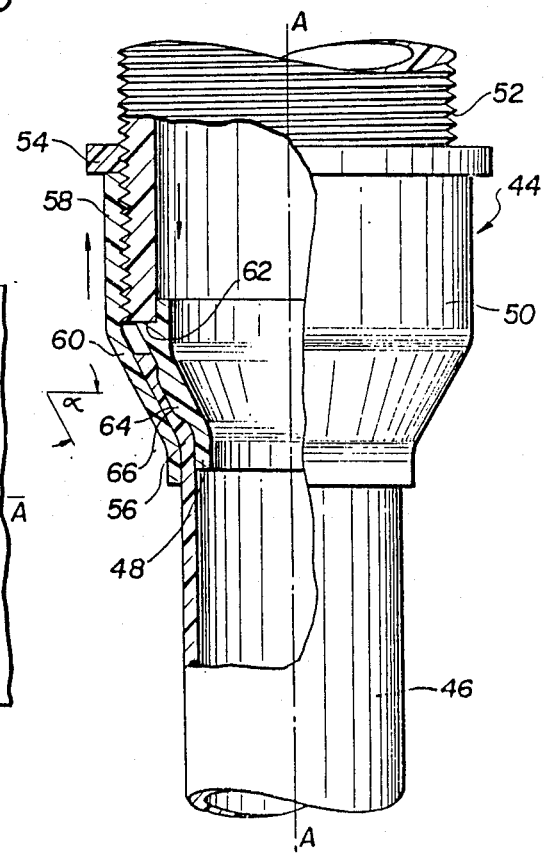
FIG. 7, which illustrates, in partial cross-sectional view, another embodiment of the invention excluding the split-ring.

A second embodiment of the invention is shown in FIG. 7. The coupling 44 can serve to connect two shafts as does the coupling 10. The coupling 44 can also serve to connect a shaft, such as the shaft 46, to any other device which need not be another shaft. For example, the coupling 44 can be used to connect the shaft 46 to the yoke of a universal joint.

The coupling 44 includes a reaction ring 48, an outer sleeve 50, a fitting 52 and a jam nut 54. As in the previous embodiment, the shaft 46 is provided with an outwardly flared end portion 56 defining a flare angle $\alpha$ as before. The outer sleeve 50 includes an upper section 58 and a lower section 60. The lower section 60 and the reaction ring 48 are also flared as is the end portion 56 of the shaft 46, defining thereby compatible engagement surfaces with the flared end portion 56. The upper section 58, the fitting 52 and the jam nut 54 have threaded surfaces for mutual engagement. The reaction ring 48 includes a shoulder 62 which engages one end of the fitting 52. Relative movement of the outer sleeve 50 and the fitting 52 in the direction shown by the arrows produces the desired pressure at the engaged surfaces of the flared segments of the coupling.

As before, to achieve a more positive alignment and torque coupling the reaction ring 48 and/or the lower section 60 of the outer sleeve 50 are provided with protrusions 64 received within corresponding recesses 66 within the flared end portion 56 of the shaft 46.

The jam nut 54 is threaded down against the upper section 58 of the outer sleeve 50 to prevent opposed relative movement of the outer sleeve 50 and the fitting 52 which would release the pressure at the engaged surfaces.

As with the first embodiment, a variant is proposed according to which the reaction ring 48 and the fitting 52 are fabricated as a single component, or the shaft 46 and reaction ring 48 are fabricated as a single component.

In each embodiment, the connection is achieved without the need to cut, or in any way deform the shaft.

An important feature of the invention resides in the formation of the outwardly flared end portions of the shafts. For metal shafts, the outwardly flared end portions can be produced by known machining casting or deformation methods. For composite shafts, the mandrel or mold is designed to produce the flared end portions. For example, in fabricating a composite shaft using the known filament-winding technique, the mandrel on which the filaments are wound includes an outwardly flared end. Typically, the filaments are wound at an angle to the longitudinal axis of the mandrel for strength enhancement. If the flared end portions are to have recesses, the mandrel is provided with protrusions, shaped, preferably, to have sides which coincide with the filament winding angle. Subsequent to winding, the wound assembly is subjected to a curing cycle and the shaft structuralized on the mandrel. Thereafter, the mandrel is removed, for example, it can be dissolved. The result is a shaft with an outwardly flared end, and, if desired, with recesses in the outwardly flared end.

Either or both the split ring 16 and reaction ring 18 are made of metal or composites. The techniques used to fabricate these parts are similar to those for fabricating the shafts. For example, in fabricating the reaction ring 18 of composite material, a filament winding technique can be used. The mandrel is simply designed to have the desired shape. In the event that protrusions are desired on the reaction ring 18, the mandrel would be provided with the protrusions. The filaments would be wound at an angle $+\theta$ (FIG. 4) to form the sides 38a, 38c and then again at an angle $-\theta$ to form the sides 38d, 38b of the protrusion 38. The result is a crossply construction.

With this invention there results a coupling with relatively few parts, the emphasis being on retaining only those parts which are located in the primary load path and as few other parts as possible. Also with this invention, there results a method of coupling two shafts which employs hoop-type pressure loading on two surfaces of the shafts to be coupled.

I claim:

1. A coupling for connecting two shafts for rotation, each shaft defining a longitudinal axis and having a hollow outwardly flared end portion relative to the longitudinal axis which defines an inner and an outer surface, at least one of said surfaces including alignment and torque transmitting means, comprising:
   a reaction ring having an outer surface comprising two surface sections which subtend one another and define an acute angle between them, each surface section engaging a respective inner surface of the outwardly flared end portions;
   adjustable clamping means having an inner surface comprising two surface sections which subtend one another and define an acute angle between them, each surface section engaging a respective outer surface of the outwardly flared end portions; and
   adjustment means for adjusting the clamping means against the outer surface of each outwardly flared end portion to thereby increase the pressure at the engaged surfaces;
   wherein:
   (i) at least one surface section of at least one of the reaction ring and adjustable clamping means includes alignment and torque transmitting means compatible with the alignment and torque transmitting means of the shaft surfaces; and
   (ii) the engagement of the compatible alignment and torque transmitting means substantially preventing relative movement between the engaged surfaces thereby aligning the longitudinal axes of the two shafts and permitting torque transmission and thereby rotation about the aligned longitudinal axes.

2. The coupling as defined in claim 1, wherein the adjustable clamping means comprises a split-ring and the adjustment means comprises a nut-and-bolt combination connecting both rings of the split-ring.

3. The coupling as defined in claim 1, wherein the reaction ring further has an inner surface comprising two surface sections, each of which extends generally parallel to a corresponding one of the outer surface sections.

4. The coupling as defined in claim 1, wherein the adjustable clamping means further has an outer surface comprising two surface sections, each of which extends generally parallel to a corresponding one of the inner surface sections.

5. The coupling as defined in claim 1, wherein the alignment and torque transmitting means for aligning the shafts and permitting torque transmission comprises at least one protrusion on the outer surface of the reaction ring and a corresponding recess in the outer surface of a facing one of the inner surfaces of an outwardly flared end portion.

6. The coupling as defined in claim 5, wherein said at least one protrusion and corresponding recess define a polygon in outline.

7. The coupling as defined in claim 1, wherein the shafts, the reaction ring and the adjustable clamping means comprise composite structures.

8. The combination, comprising:
   at least two shafts fabricated of composite material, each shaft defining a longitudinal axis and having a hollow, outwardly flared end portion, by construction, relative to the longitudinal axis which defines an inner and an outer surface at least one of said surfaces including alignment and torque transmitting means; and
   a coupling for connecting adjacent shafts at their flared end portions for rotation, said coupling comprising:
   (i) a reaction ring having an outer surface comprising two surface sections which subtend one another and define an acute angle between them, each surface section engaging a respective inner surface of the outwardly flared end portions;
   (ii) adjustable clamping means having an inner surface comprising two surface sections which subtend one another and define an acute angle between them, each surface section engaging a respective outer surface of the outwardly flared end portions; and
   (iii) adjustment means for adjusting the clamping means against the outer surface of each outwardly flared end portion to thereby increase the pressure at the engaged surfaces; wherein:
   (i) at least one surface section of at least one of the reaction ring and adjustable clamping means includes alignment and torque transmitting means compatible with the alignment and torque transmitting means of the shaft surfaces; and
   (ii) the engagement of the compatible alignment and torque transmitting means substantially preventing relative movement between the engaged surfaces thereby aligning the longitudinal axes of the two shafts and permitting torque transmission and thereby rotation about the aligned longitudinal axes.

9. The combination as defined in claim 8, wherein the adjustable clamping means comprises a split-ring and the adjustment means comprises a nut-and-bolt combination connecting both rings of the split-ring.

10. The combination as defined in claim 9, wherein the reaction ring is fabricated of composite material.

11. The combination as defined in claim 9, wherein the split-ring is fabricated of composite material.

12. The combination as defined in claim 9, wherein the reaction ring and the split-ring are fabricated of composite material.

13. The combination as defined in claim 8, wherein the alignment and torque transmitting means for aligning the shafts and permitting torque transmission comprises at least one protrusion on the outer surface of the reaction ring and a corresponding recess in the inner surface of a facing one of the inner surface of an outwardly flared end portion.

14. The combination as defined in claim 13, wherein said at least one protrusion and corresponding recess define a polygon in outline.

* * * * *